United States Patent [19]

Sevenish et al.

[11] Patent Number: 5,894,773
[45] Date of Patent: Apr. 20, 1999

[54] SYSTEM FOR FORMING AND CUTTING A MINERAL FIBER TOW

[75] Inventors: Scott W. Sevenish, Reynoldsburg; Ralph E. Brandon; Terry R. Beaver, both of Newark, all of Ohio

[73] Assignee: Owens Corning Fiberglas Technology, Inc., Summit, Ill.

[21] Appl. No.: 08/706,162

[22] Filed: Aug. 30, 1996

[51] Int. Cl.[6] .................... B26D 1/00; B26D 7/06
[52] U.S. Cl. .......... 83/13; 83/24; 83/98; 83/100; 83/853; 83/331
[58] Field of Search .................. 83/13, 24, 98, 83/100, 402, 331, 343, 346, 913, 835, 848, 853

[56] References Cited

U.S. PATENT DOCUMENTS

| | | | |
|---|---|---|---|
| 40,987 | 12/1863 | Whitely et al. | |
| 97,037 | 3/1869 | Buchholz | |
| 663,559 | 12/1900 | Case | |
| 690,238 | 12/1901 | Crean | |
| 1,360,887 | 11/1920 | Clark | |
| 1,433,485 | 10/1922 | Sherban | |
| 1,504,781 | 8/1924 | Pomeroy | |
| 1,722,999 | 10/1929 | Andrews et al. | |
| 2,533,550 | 12/1950 | Blackwell | |
| 3,055,597 | 9/1962 | Mund | |
| 3,197,147 | 7/1965 | Krohne | |
| 3,261,741 | 7/1966 | Bidwell | |
| 3,776,084 | 12/1973 | Slyvakov | 83/913 |
| 3,866,842 | 2/1975 | Linzberger | |
| 3,869,268 | 3/1975 | Briar et al. | |
| 3,979,075 | 9/1976 | Heron | |
| 4,024,647 | 5/1977 | Schaefer | |
| 4,158,555 | 6/1979 | Kallenborn | |
| 4,308,997 | 1/1982 | Valco | |
| 4,399,589 | 8/1983 | Hefti | 83/913 |
| 4,445,408 | 5/1984 | Keith | 83/913 |
| 4,537,610 | 8/1985 | Armstrong et al. | |
| 4,551,160 | 11/1985 | Frailey et al. | |
| 4,576,621 | 3/1986 | Chappelear et al. | |
| 5,312,056 | 5/1994 | Kastingschafer et al. | |
| 5,352,258 | 10/1994 | DeGreve et al. | |
| 5,363,776 | 11/1994 | Wark | |
| 5,431,992 | 7/1995 | Houpt et al. | |
| 5,450,777 | 9/1995 | Molnar et al. | 83/913 |
| 5,505,389 | 4/1996 | Sussegger et al. | |

*Primary Examiner*—M. Rachuba
*Attorney, Agent, or Firm*—C. Michael Gegenheimer; Curtis B. Brueske

[57] ABSTRACT

A system is provided for forming a continuous mineral fiber wool tow and cutting the tow into discrete lengths. The system comprises a conveying apparatus for pulling a mineral fiber wool tow from a mineral fiber pack at a first location and transporting the tow to a chopping station. A chopping apparatus is positioned at the chopping station for chopping the tow into discrete lengths. The conveying apparatus further receives the discrete lengths at the chopping station and transports the discrete lengths to a collecting station. The conveying apparatus further includes a collection device located at the collecting station for receiving the discrete lengths of mineral fiber wool material and collecting the discrete lengths for subsequent use.

20 Claims, 8 Drawing Sheets

SYSTEM FOR FORMING AND CUTTING A MINERAL FIBER TOW

TECHNICAL FIELD

This invention relates to a system for collecting a mineral fiber wool tow from a forming apparatus, transporting the tow to a chopping station, chopping the tow into discrete lengths and packaging the chopped fibers.

BACKGROUND AND SUMMARY

Chopping devices for cutting glass filaments are known in the art. For example, U.S. Pat. No. 3,869,268 to Briar et al. teaches a device for chopping continuous glass filaments drawn from streams of molten glass into discrete segments. The device comprises a cot roll and a juxtaposed cutting roll, which together define a cutting nip for receiving the glass filaments. The cot and cutting rolls supply the attenuation forces to draw the streams of molten glass into filaments and further serve to chop the glass filaments into discrete segments. Because the filaments are continuous and pulled by the cot and cutter rolls towards them, conveying or delivering the glass filaments to the cutting nip is generally not a problem. Also, because the filaments are continuous and due to their weight, it is typically not difficult to keep the glass filaments properly positioned between the cot and cutting rolls during the cutting step.

It would be desirable to use a chopping device comprising cot and cutting rolls to cut a light-weight mineral fiber wool tow into discrete sections. However, in order to do so, a conveying system must be designed which is capable of delivering a light-weight tow to a cutting nip between cot and cutting rolls. The system must also be capable of maintaining the light-weight tow properly positioned between the two rolls.

In accordance with the present invention, a conveying system is provided which is capable of delivering a light-weight tow to a cutting nip between cot and cutting rolls.

In accordance with a first aspect of the present invention, a system is provided for forming a continuous mineral fiber wool tow and cutting the tow into discrete lengths. The system comprises a conveying apparatus for pulling a mineral fiber wool tow from a mineral fiber pack at a first location and transporting the tow to a chopping station. A chopping apparatus is positioned at the chopping station for chopping the tow into discrete lengths. The conveying apparatus further receives the discrete lengths at the chopping station and transports the discrete lengths to a collecting station. The conveying apparatus further includes a collection device located at the collecting station for receiving the discrete lengths of mineral fiber wool material and collecting the discrete lengths for subsequent use.

Preferably, the chopping apparatus comprises a cot roll having a generally smooth outer circumferential surface; a drive motor for effecting rotation of the cot roll; a rotatable cutting roll juxtaposed to the cot roll and contacting the cot roll at its circumferential surface to rotate with the cot roll; and a substantially air-tight enclosure surrounding the cot roll and the cutting roll. The rotatable cutting roll and the cot roll define a cutting nip for receiving the tow such that the tow is received in the nip and cut into discrete lengths.

The cutting roll may comprise a cutting wheel having a plurality of cutting blades associated therewith and spaced apart from one another about the cutting wheel.

The conveying apparatus preferably comprises a collection hood for receiving the mineral fiber tow; a nozzle extending into the air-tight enclosure for delivering the tow to the cutting nip; a first conduit section coupled to and extending between the hood and the nozzle; a second conduit section coupled to and extending between the chopping device and the collection device and a vacuum pump associated with the collection device for drawing a vacuum in the collection device, the air-tight enclosure, the nozzle, the first and second conduit sections, and the collection hood.

In one embodiment, the conveying apparatus further comprises a third conduit section coupled to and extending between the collection hood and the second conduit section for defining a bypass path for the tow when the tow is to be conveyed to the collecting station without being cut into discrete lengths. A first valve device may be associated with the first conduit section for allowing the tow to pass through the first conduit section when the first valve device is in its open position and for preventing the tow from passing through the first conduit section when the first valve device is in its closed position. A second valve device may be associated with the third conduit section for allowing the tow to pass through the third conduit section when the second valve device is in its open position and for preventing the tow from passing through the third conduit section when the second valve device is in its closed position.

In accordance with a second aspect of the present invention, a chopping device is provided for cutting a continuous mineral fiber wool tow into discrete lengths. The cutting device comprises a cot roll having a generally smooth outer circumferential surface; a drive motor for effecting rotation of the cot roll; and a rotatable cutting roll juxtaposed to the cot roll and contacting the cot roll at its circumferential surface to rotate with the cot roll. The rotatable cutting roll and the cot roll define a cutting nip for receiving the tow such that the tow is received in the nip and cut into discrete lengths. The cutting roll preferably comprises a cutting wheel having a plurality of cutting blades associated therewith and spaced apart from one another about the cutting wheel. At least one of the cutting blades has a generally V shape, a chevron shape or is formed in the shape of an arc.

In one of the illustrated embodiments, the blades are spaced apart from one another about the cutting wheel such that at least one blade is always in contact with the cot roll during rotation of the cot roll and the cutting roll.

It is further contemplated that the cutting roll may further comprise a plurality of teeth positioned about at least one of the outer circumferential edges of the cutting wheel.

In accordance with a third aspect of the present invention, a method is provided for forming a continuous mineral fiber wool tow and cutting the tow into discrete lengths. The method comprises the steps of: pulling a continuous mineral fiber wool tow from a mineral fiber pack; conveying the tow to a chopping station; chopping the tow into discrete lengths at the chopping station; and transporting the discrete lengths from the chopping station to a collecting station where the discrete lengths are collected for subsequent use.

Accordingly, it is an object of the present invention to provide a conveying system which is capable of delivering a light-weight tow to a cutting nip between cot and cutting rolls. It is further an object of the present invention to provide a conveying system which is capable of maintaining a light-weight tow generally centered between cot and cutting rolls such that the tow is cut into discrete lengths or segments. It is another object of the present invention to provide a method and apparatus for cutting a mineral fiber wool tow into discrete lengths.

These and other objects and advantages of the present invention will be apparent from the following description, the accompanying drawings and the appended claims.

DETAILED DESCRIPTION

Figure 1:
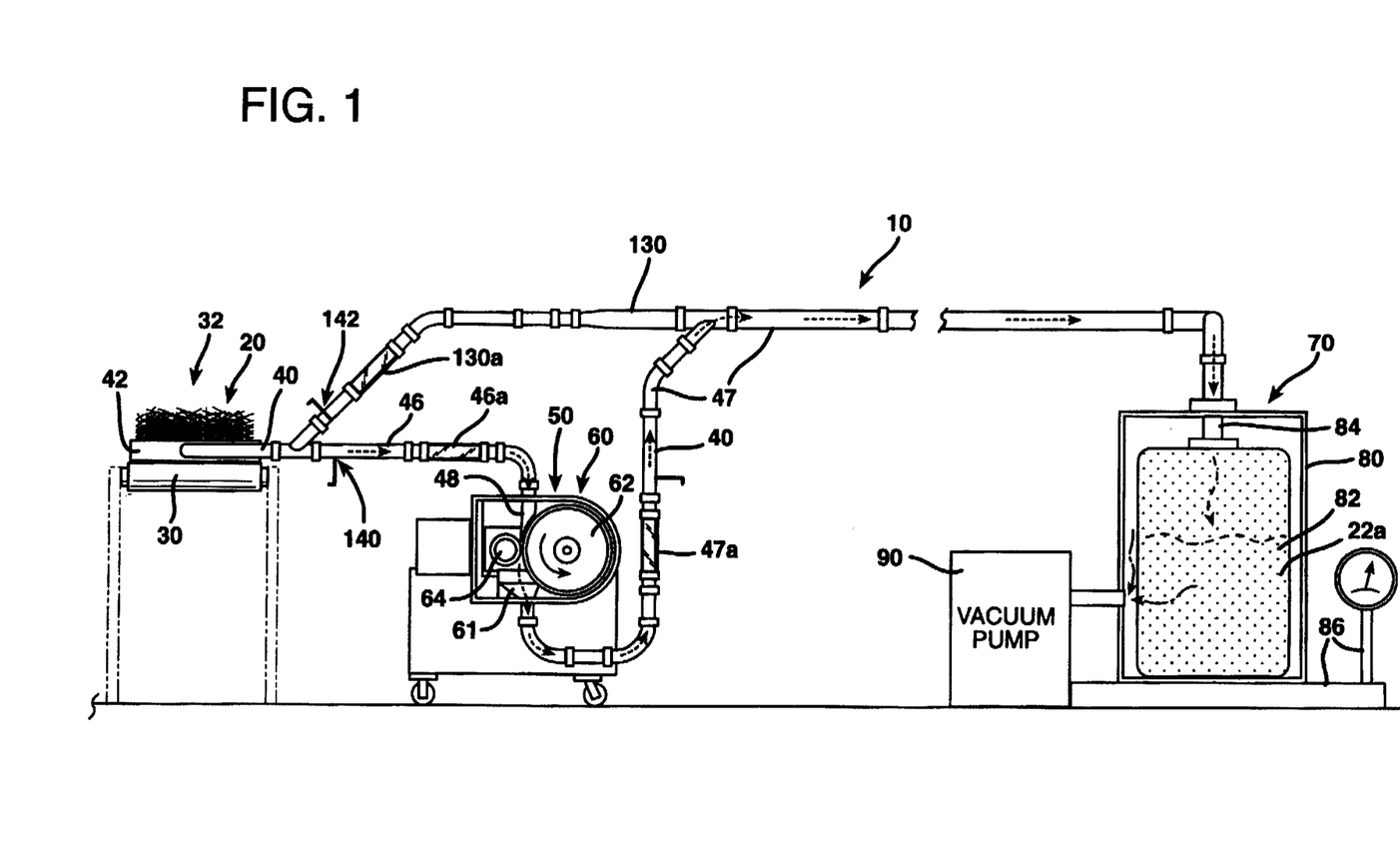
FIG. 1 is a side view of a system constructed in accordance with a first embodiment of the present invention for receiving and chopping a continuous mineral fiber wool tow into discrete lengths.

A system 10 constructed in accordance with a first embodiment of the present invention is illustrated in FIG. 1. The system 10 comprises a conveying apparatus 40 for pulling a tow 20a from a mineral fiber wool pack 20 traveling along a take-away conveyor 30, and transporting the tow 20a to a chopping station 50. A chopping apparatus 60 (also referred to herein as a chopping device) is positioned at the chopping station 50 for chopping the tow 20a into discrete lengths 22a. The conveying apparatus 40 further receives the discrete lengths 22a at the chopping station 50 and transports the discrete lengths to a collecting station 70. The conveying apparatus 40 further includes a collection device 80 located at the collecting station 70 for receiving the discrete lengths 22a and collecting the discrete lengths 22a for subsequent use.

In the illustrated embodiments, the mineral fiber wool pack 20 is formed from irregularly shaped glass fibers.

The irregularly shaped fibers are entangled and require no binder. The fibers are formed via a rotary fiberizing apparatus (not shown). The take-away conveyor 30 may be positioned beneath the rotary fiberizing apparatus for capturing the long glass fibers and delivering the fibers to a first location 32 where the tow 20a of the fibers is pulled from the pack 20 by the conveying apparatus 40 (see FIG. 1). A description of such fibers and methods for producing same are set forth in commonly assigned U.S. Pat. No. 5,431,992 and co-pending U.S. patent application Ser. No. 08/240,428, filed May 10, 1994; and U.S. patent application Ser. No. 08/310,183 filed Sep. 21, 1994; all of which are incorporated by reference herein in their entirety.

Figure 2:
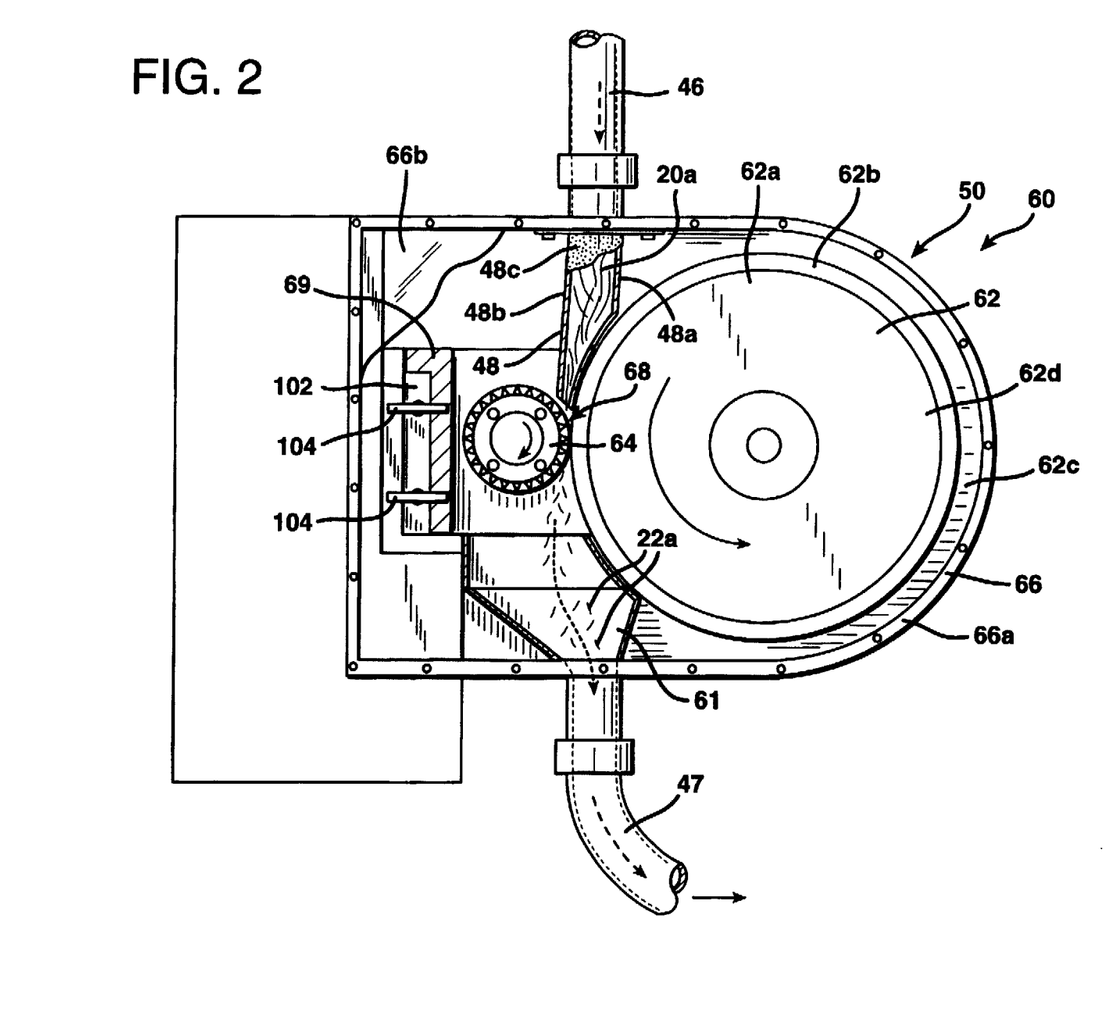
FIG. 2 is a side view of the chopping apparatus illustrated in FIG. 1 with portions shown in cross section and other portions shown partially removed.

Referring now to FIGS. 1 and 2, the chopping apparatus 60 comprises a cot roll 62, a conventional drive motor (not shown) coupled to the cot roll 62 for effecting rotation of the cot roll 62, and a rotatable cutting roll 64. The cutting roll 64 is juxtaposed to the cot roll 62 and contacts the cot roll 62 at its outer circumferential surface 62c such that the cutting roll 64 is rotated by the cot roll 62. The rotatable cutting roll 64 and the cot roll 62 define a cutting nip 68 for receiving the tow 20a. As the tow 20a passes between the cot and cutting rolls 62 and 64, it is cut into discrete lengths 22a. A collecting structure 61 is positioned below the cot and cutting rolls 62 and 64 for collecting the chopped discrete lengths 22a before they are received by the conveying apparatus 40.

The cot roll 62 comprises a metal hub 62a formed, for example, from aluminum, and a removable outer portion 62b mounted on the hub 62a. The outer portion 62b is preferably formed from polyurethane or a like polymeric material and has a generally smooth outer circumferential surface 62c. The chopping apparatus 60 further includes an air-tight enclosure 66 surrounding the cot roll 62 and the cutting roll 64. The air-tight enclosure 66 includes a pivotable access door 66a which has a clear side panel 66b formed from glass or a clear polymeric material (see FIG. 2).

Figure 3:
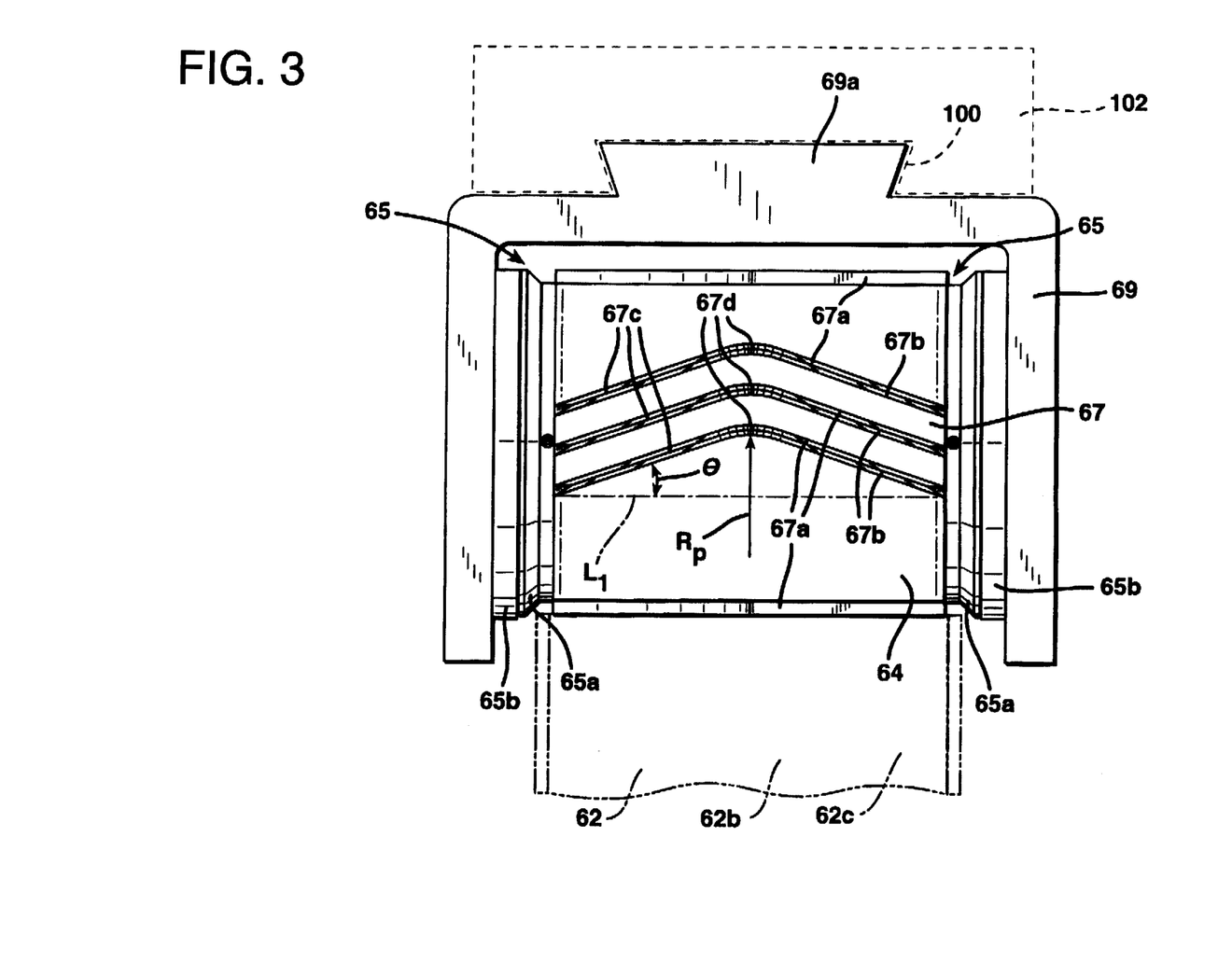
FIG. 3 is a top view of the cutting roll shown in FIG. 2 mounted in a U-shaped frame.

Referring now to FIG. 3, the cutting roll 64 is mounted at each end via a mounting assembly 65 having a rotatable inner portion 65a and a nonrotating outer portion 65b which is clamped within a U-shaped frame 69. The inner and outer portions 65a and 65b have interlocking concentric rings on their adjacent faces which prevent dust from reaching a bearing assembly (not shown) located between the portions 65a and 65b. The frame 69 has a tongue portion 69a which is received in a groove 100 provided in a mounting structure 102, see also FIG. 2. Bolts 104, shown only in FIG. 2, are provided for frictionally locking the tongue portion 69a in the groove 100. The mounting structure 102 and, hence, the cutting roll 64 are movable toward and away from the cot roll 62 by conventional apparatus not shown.

In the embodiment illustrated in FIGS. 2 and 3, the cutting roll 64 comprises a cutting wheel 67 and a plurality of cutting blades 67a which are integral with the cutting wheel 67. The cutting roll 64 is formed from a hollow, cylindrical steel section. The section is machined such that the blades 67a are cut into the steel section. The height of the cutting blades 67a preferably falls within the range of 0.20 inch to 0.30 inch (0.005 meter to 0.0076 meter). The machined section is heat treated. After the heat treating step, the blades 67a are sharpened via a grinding step. In this embodiment, the blades 67a are spaced apart from one another about the cutting wheel 67 such that at least one blade 67a is always in contact with the cot roll 62 during rotation of the cot roll 62 and the cutting roll 64.

The blades 67a have a chevron shape (only five of the blades 67a are shown in FIG. 3). That is, each blade 67a comprises right and left hand helix portions 67b and 67c, each of which extends from a cutting wheel surface line $L_1$ at an angle $\Theta$. The cutting wheel surface line $L_1$ is parallel to the axis of rotation of the cutting wheel 67. The angle $\Theta$ preferably falls within the range of 5° to 50°, and more preferably within the range of 20° to 40°. Each blade 67a also includes a smooth radius transition portion 67d which extends between the helix portions 67b and 67c. The radius Rp of portion 67d preferably falls within the range of 0.5 inches to 3 inches (0.01 meter to 0.08 meter). The larger the value of the radius $R_p$, the less likely that the cot roll 62 will be damaged, i.e., gouged, by the blades 67a. Preferably, the cutting roll 64 is rotated such that the transition portion 67d of each blade 67a is the last portion of the cutting blade 67a to pass through the nip 68.

Because the blades 67a are chevron shaped, airflow through the nip 68 and around the cot and cutting rolls 62 and 64 is controlled such that the light-weight tow 20a is maintained centered as it travels between the two rolls 62 and 64. Conventional cutting rolls oftentimes have knife blades wrapped about the cutting wheel portion of the cutting roll at a 10° to 30° helix angle. Such a cutting roll, if used to cut a tow of light-weight wool material, is likely to act as a blower causing the tow of wool material to follow the airflow and bypass the nip between the cot and cutting rolls. The cutting blades 67a of the present invention, however, center the airflow between the cot and cutting rolls 62 and 64 such that the tow 20a is maintained properly positioned between the two rolls 62 and 64.

Figure 4:
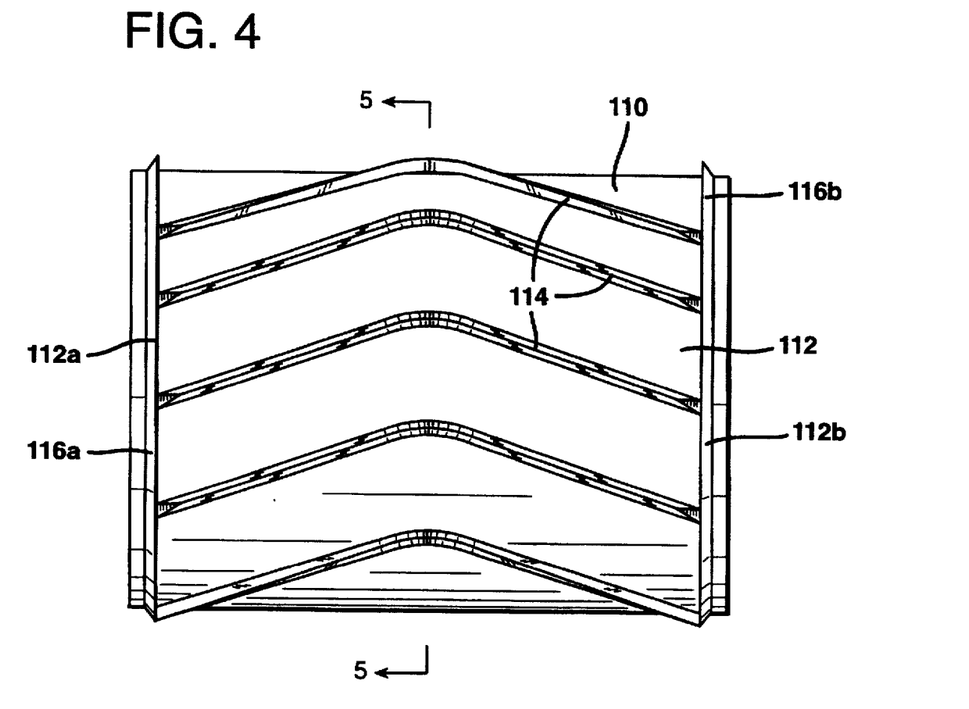
FIG. 4 is a longitudinal side view of a cutting roll formed in accordance with a second embodiment of the present invention.
Figure 5:
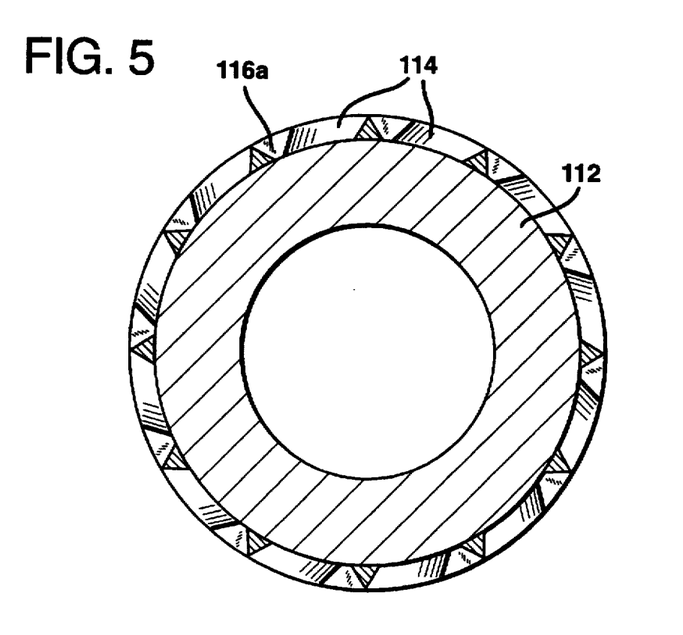
FIG. 5 is a view taken along section line 5—5 in FIG. 4.

A cutting roll 110, formed in accordance with a second embodiment of the present invention, is shown in FIGS. 4 and 5. The cutting roll 110 comprises a cutting wheel 112 and a plurality of cutting blades 114 which are integral with the cutting wheel 112. The blades 114 have a chevron shape which shape is similar to that of the blades 67a illustrated in FIG. 3. The cutting roll 110 further includes first and second annular cutting blades 116a and 116b which are positioned at opposite ends 112a and 112b of the cutting wheel 112. The cutting blades 116a and 116b cut away any tow material that extends beyond the width of the cutting blades 114. Because of the spacing between the cutting blades 114, a cutting blade 114 is not always in contact with the cot roll 62 during rotation of the cot roll 62 and the cutting roll 110. However, the cutting blades 116a and 116b are in constant engagement with the cot roll 62 during the cutting operation, thereby ensuring that the cot roll 62 effects smooth and continuous rotation of the cutting roll 110. The cutting blades 116a and 116b also help control airflow through the nip 68 and around the cot and cutting rolls 62 and 64.

Figure 6:
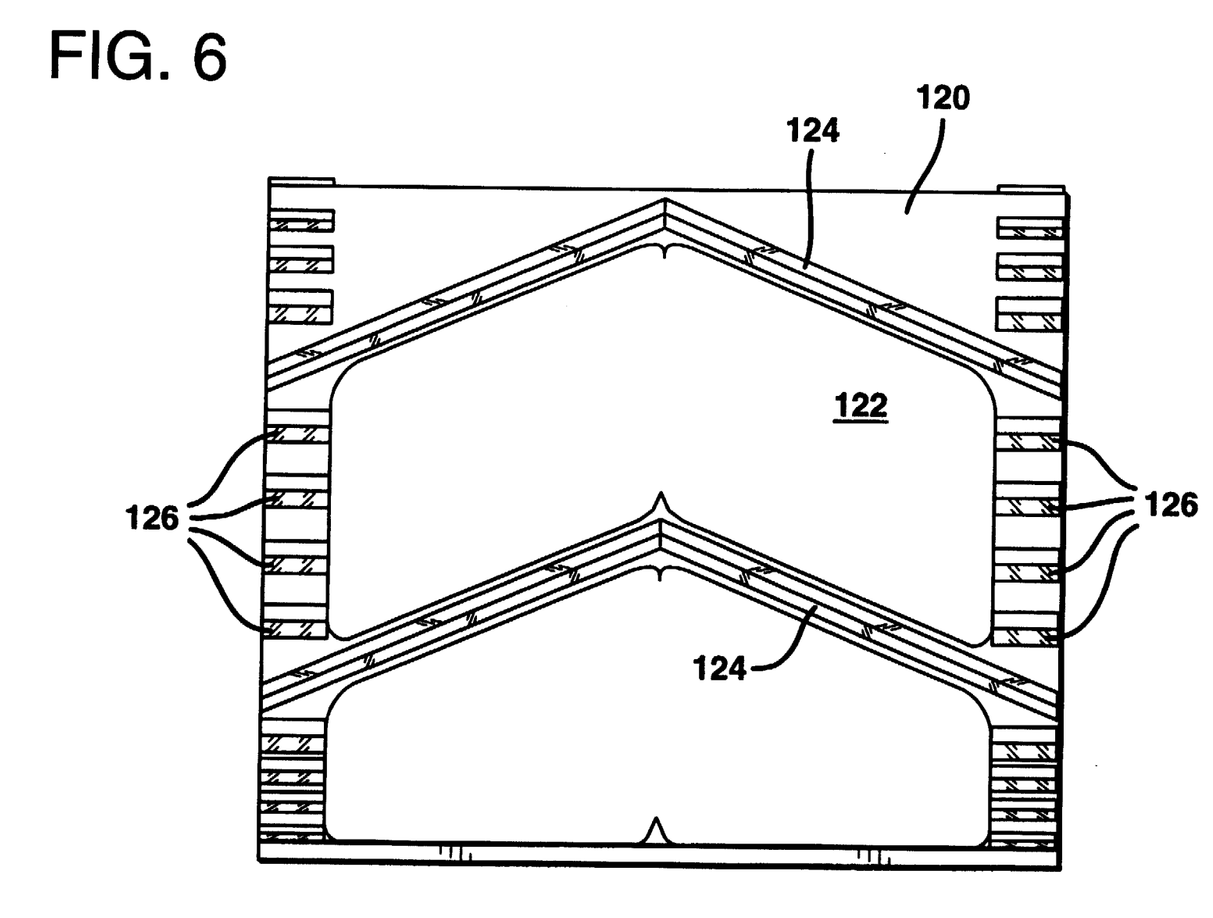
FIG. 6 is a longitudinal side view of a cutting roll formed in accordance with a third embodiment of the present invention.

A cutting roll 120, formed in accordance with a third embodiment of the present invention, is shown in FIG. 6. In this embodiment, the cutting roll 120 comprises a cutting wheel 122 and a plurality of cutting blades 124 which are integral with the cutting wheel 122. The blades 124 are V-shaped. The spacing between the blades 124 is such that a cutting blade 124 is not always in contact with the cot roll 62 during rotation of the cot roll 62 and the cutting roll 120. To ensure that the cutting roll 120 is driven in a smooth and continuous manner, the cutting roll 120 further includes teeth 126 which engage the cot roll 62. The teeth 126 are integral with the cutting wheel 122 and may be formed via a machining operation. The height of the teeth 126 is essentially the same as the height of the cutting blades 124. The teeth are closely spaced from one another, e.g., 0.5 inch (1.3 cm) from one another.

It is further contemplated that cutting blades shaped in the form of a continuous arc having a radius ranging from, for example, three inches to six inches (7.5 to 15 cm), may be used in place of the cutting blades 67a, 114, and 125. It is also contemplated that the cutting blades may be formed as straight blades which are substantially parallel to the axis of rotation of the cutting roll. It is still further contemplated that the cutting blades may have a helix shape such that they form an angle of approximately 2° with a line generally parallel to the axis of rotation of the cutting roll. When substantially straight cutting blades or blades having a helix shape are used, it may be preferable to include annular cutting blades similar to cutting blades 116a and 116b to more effectively control airflow through the nip 68 and around the cot and cutting rolls 62 and 64. It is also contemplated that annular plates without cutting edges may be substituted for the annular cutting blades to control airflow and to ensure adequate contact between the cutting roll and the cot roll. Cutting blades having shapes not explicitly set out herein may also be employed so long as they are effective in cutting the tow 20a into discrete lengths 22a.

Figure 7:
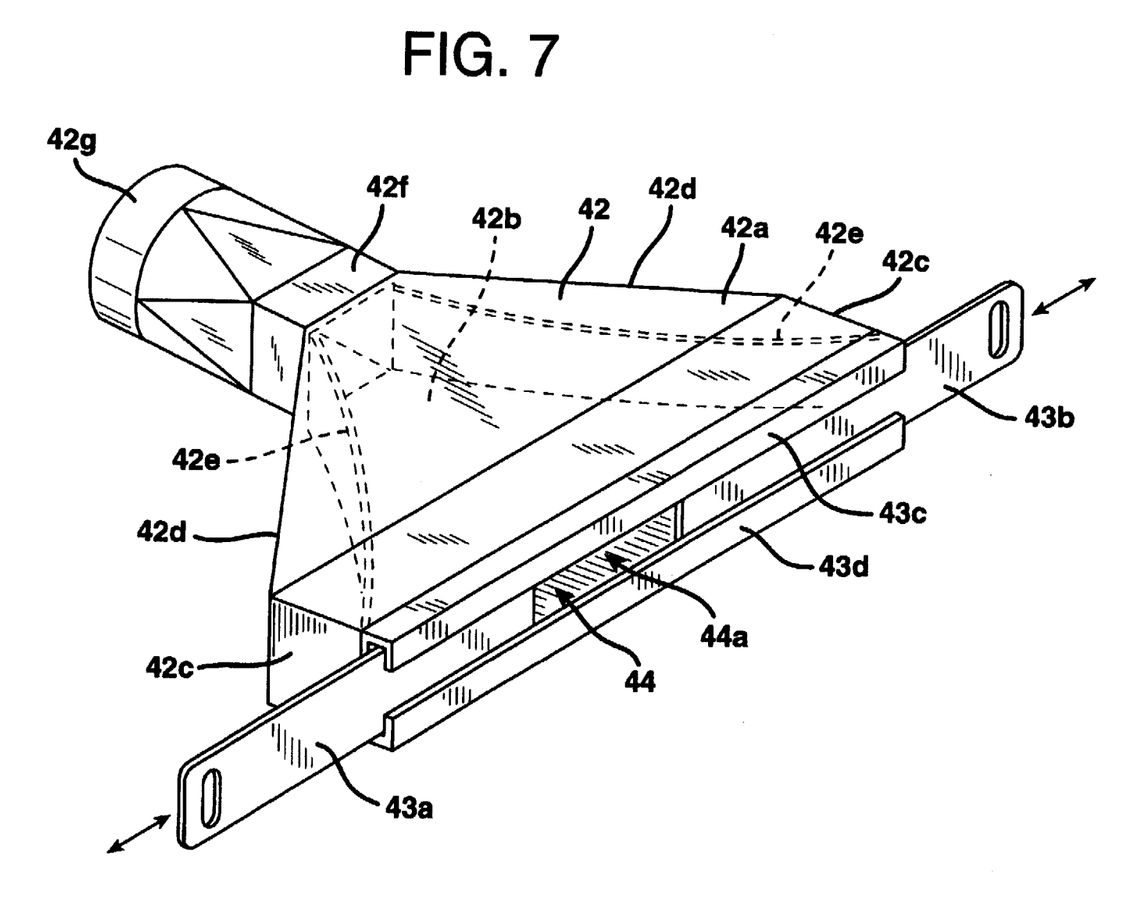
FIG. 7 is a perspective view of a collection hood.

Referring now to FIGS. 1 and 7, the conveying apparatus 40 includes a collection hood 42 which is positioned just above the take-away conveyor 30 and along the path of travel of the tow 20a for pulling the tow 20a off the conveyor 30. As will be discussed below, the collection hood 42 communicates with a vacuum pump 90 such that an airstream is drawn into the collection hood 42 which pulls with it the tow 20a.

The collection hood 42 comprises upper and lower plates 42a and 42b and first side plates 42c which define an opening 44 through which the tow 20a passes. The size of the opening 44 may, for example, be three inches (7.5 cm) in height and 28 inches (71.1 cm) in width. Movable entrance plates 43a and 43b are slidably received in upper and lower tracks 43c and 43d which are fixedly secured to the upper and lower plates 42a and 42b and the side plates 42c. The movable plates 43a and 43b and the tracks 43c and 43d define the size of an entrance 44a into the collection hood 42. The size of the entrance 44a can be varied by repositioning the plates 43a and 43b within the tracks 43c and 43d. By varying the size of the entrance 44a, the vacuum in the conveying apparatus 40 and, hence, the speed at which the tow 20a passes through the conveying apparatus 40, can be varied. The collection hood 42 further comprises second side plates 42d, vertical baffles 42e, an intermediate rectangular section 42f and an end circular section 42g.

As shown in FIGS. 1 and 2, the conveyor apparatus 40 further includes a first conduit section 46, a nozzle 48 and a second conduit section 47. The first conduit section 46 is coupled to and extends between the collection hood 42 and the nozzle 48 (see FIG. 1). The second conduit section 47 is coupled to and extends between the chopping apparatus 60 and the collection device 80. The vacuum pump 90, which also forms part of the conveyor apparatus 40, communicates with the collection device 80 and, hence, draws a partial vacuum in the collection device 80, the second conduit section 47, the airtight enclosure 66, the nozzle 48, the first conduit section 46, and the collection hood 42. Consequently, an airstream together with the tow 20a are pulled via the vacuum pump 90 into the air-tight enclosure 66 of the chopping apparatus 60 after first passing through the collection hood 42, the first conduit section 46 and the nozzle 48. The vacuum pump 90 also effects movement of the discrete lengths 22a from the air-tight enclosure 66 and the collecting structure 61, through the 30second conduit section 47 and into the collection device 80.

The take-away conveyor 30 is preferably operated at a sufficiently high speed, e.g., 80 feet per minute (24.4 meters per minute) such that the fibers deposited by the fiberizing apparatus onto the take-away conveyor 30 are loosened sufficiently to allow the pack 20 to be easily stretched by the conveyor apparatus 40 and pulled into a single tow 20a. Preferably, the vacuum pump 90 is sufficient to pull the tow through the first conduit section 46 at a speed of approximately 4000 feet per minute (1220 meters per minute). The cot roll 62 should be driven such that the cot and cutting rolls 62 and 64 have outer linear surface speeds which are approximately the same as the speed at which the tow 20a moves through the first conduit section 46. The first section 46 may have an inner diameter of about 3 inches (0.076 meter) and the second section 47 may have an inner diameter of about four inches (0.1 meter).

The nozzle 48 extends into the air-tight enclosure 66 for delivering the tow 20a to the cutting nip 68 after it has first passed through the collection hood 42 and the first conduit section 46, see FIG. 2. The nozzle 48 must dissipate the high-speed airstream pulling the tow 20a toward the cutting nip 68 before the airstream reaches the nip 68. If the airstream is not dissipated, the tow 20a will follow the path of the undissipated airstream which, after first striking the outer surface 62c of the cot roll 62, moves laterally out the frontside 62d or the backside of the cot roll 62. Hence, if the airstream is not dissipated, the tow 20a is likely to bypass the cutting nip 68 without being chopped.

Figure 8:
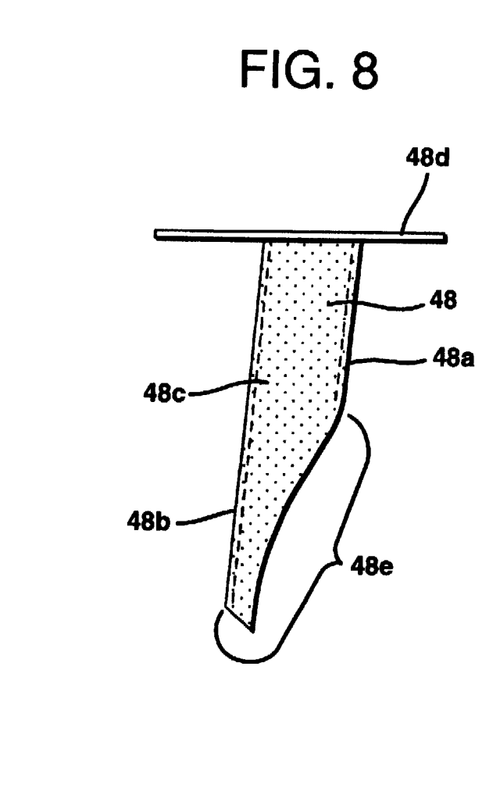
FIG. 8 is a side view of the nozzle shown in FIG. 2.

The nozzle 48 comprises a back section 48a facing the cot roll 62, a front section 48b which is opposed to the back section 48b, side sections 48c which extend between the front and back sections 48a and 48b, and a mounting plate 48d, see FIGS. 2 and 8. The front, back and side sections 48a–48c are formed from perforated steel which, for example, has a 40% open area. The back section 48a extends only partially along the length of the front and side sections 48c and defines with the front and side sections 48b and 48c an outlet 48e. As can be seen in FIG. 2, the tow 20a, after passing through the nozzle outlet 48e, strikes the outer circumferential surface 62c of the cot roll 62 and then moves with the cot roll 62 into the cutting nip 48.

Figure 9:
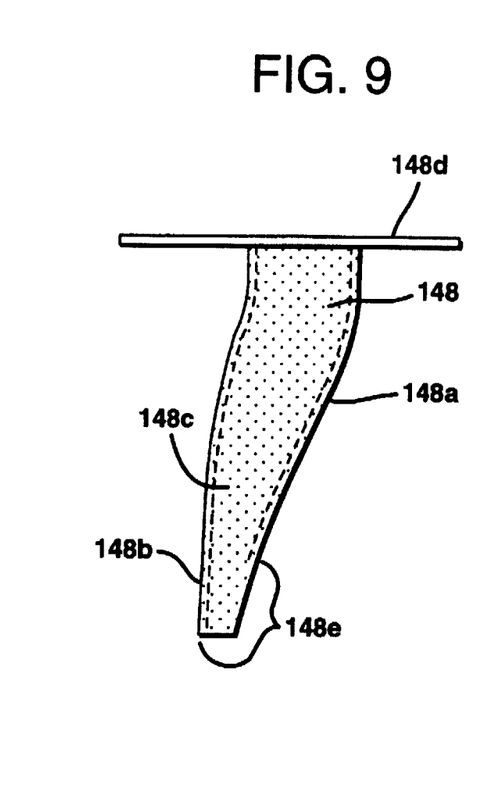
FIG. 9 is a side view of a nozzle constructed in accordance with another embodiment of the present invention.

A nozzle 148 formed in accordance with a further embodiment of the present invention is shown in FIG. 9. The nozzle 148 comprises a back section 148a facing the cot roll 62, a front section 148b which is opposed to the back section 148a, side sections 148c which extend between the front and back sections 148a and 148b, and a mounting plate 148d. The front and side sections 148b and 148c are formed from a perforated sheet of steel or other similar material. The back section 148a is formed from solid stainless steel. It is further contemplated that the back section 148a may also be formed from perforated steel. The back section 148a together with the front and side sections 148b and 148c define an outlet 148e. Because of the somewhat small size of the outlet 148e, the nozzle 148 delivers the tow 20a in a very controlled manner tangentially to the cot roll 62.

Figure 9A:
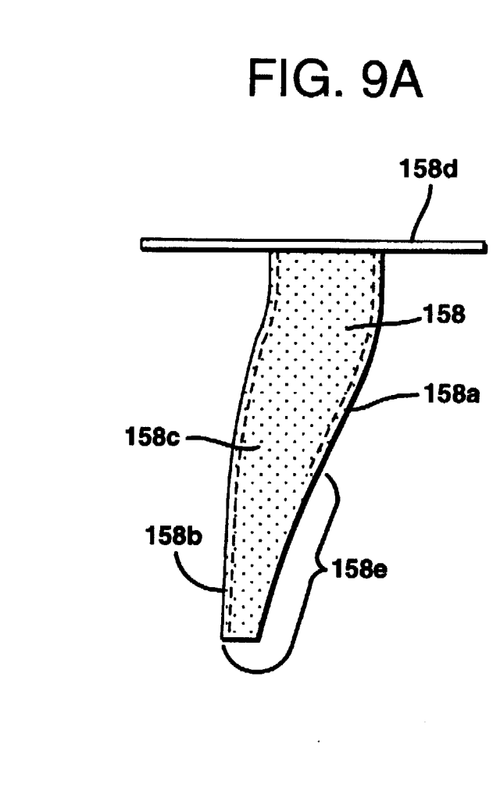
FIG. 9A is a side view of a nozzle constructed in accordance with still another embodiment of the present invention.

A nozzle 158 formed in accordance with another embodiment of the present invention, is shown in FIG. 9A. The nozzle 158 is very similar in construction to nozzle 148 shown in FIG. 9, except that the front, back and side sections 158a, 158b and 158c define an outlet 158e which is larger than outlet 148e. The larger outlet 158e reduces the likelihood that the tow 20a might bunch up or become plugged within the nozzle 158. However, some placement control is lost because of the larger size outlet 158e.

The collection device 80 is provided with a flexible, breathable collection bag 82 formed from woven polypropylene material. The bag 82 sits within a metal support frame (not shown) which forms part of the collection device 80. An intermediate conduit section 84 extends between the second conduit section 47 and into the collection bag 82 such that the discrete lengths 22a are deposited in the bag 82. The collection device 80 is shown in the illustrated embodiment associated with a scale 86. When the bag 82 is filled with discrete lengths 22a such that the bag 82 reaches a predetermined weight as measured by the scale 86, a valve (not shown) is closed to deadhead the vacuum pump 90 and the bag 82 is removed from the collection device 80. Another bag is then inserted into the collection device 80 and operation is resumed. The removed bag is closed in a conventional manner and stored for subsequent use. It is contemplated that the discrete lengths 22a can be used during a wet-laid mat forming process or during traditional textile operations such as carding, garnetting, and the like.

The conveying apparatus 40 in the FIG. 1 embodiment additionally comprises a third conduit section 130 coupled to and extending between the collection hood 42 and the second conduit section 47. The third section 130 defines a bypass path for the tow 20a when the tow 20a is to be conveyed to the collecting station 70 without being cut into discrete lengths 22a.

In the illustrated embodiment, a first gate valve device 140 is associated with the first conduit section 46 for allowing the tow 20a to pass through the first conduit section 46 when the first valve device 140 is in its open position and for preventing the tow 20a from passing through the first conduit section 46 when the first valve device 140 is in its closed position. A second gate valve device 142 is associated with the third conduit section 130 for allowing the tow 20a to pass through the third conduit section 130 when the second valve device 142 is in its open position and for preventing the tow 20a from passing through the third conduit section 130 when the second valve device 142 is in its closed position. When the tow 20a is to be chopped into discrete lengths 22a, the first valve device 140 is moved to its open position and the second valve device 142 is closed. When the tow 20a is not to be chopped into discrete lengths, the first valve device 140 is moved to its closed position and the second valve device 142 is moved to its open position.

In the illustrated embodiment, the first, second and third sections 46, 47 and 130 are provided with generally clear conduit portions 46a, 47a and 130a which allow an operator to visually monitor tow movement through the first, second and third sections 46, 47 and 130.

Figure 10:
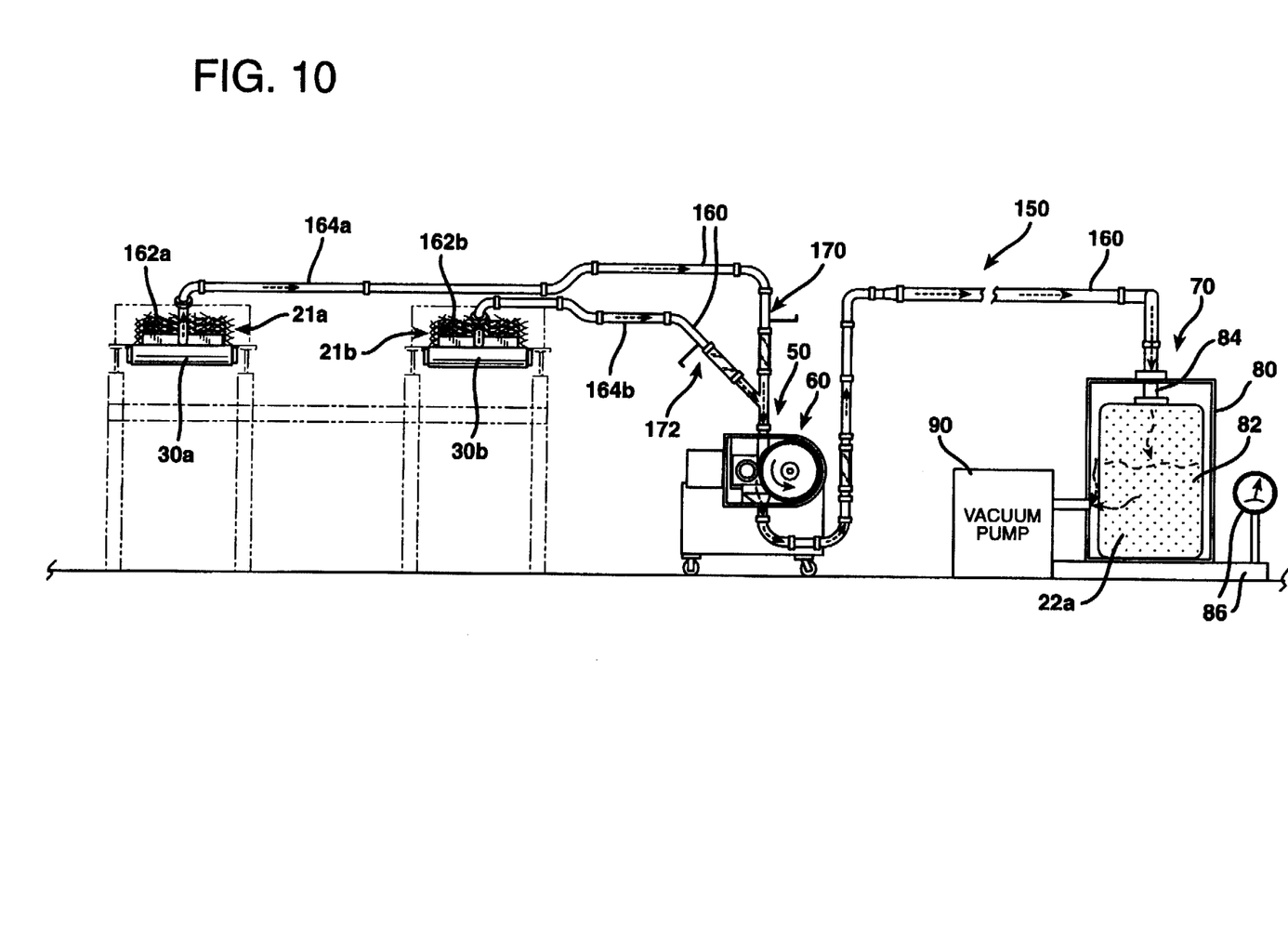
FIG. 10 is a side view of a system constructed in accordance with a further embodiment of the present invention for receiving and chopping a continuous mineral fiber wool tow into discrete lengths.

A system 150 constructed in accordance with a second embodiment of the present invention is illustrated in FIG. 10, wherein like reference numerals indicate like elements. The system 150 comprises a conveying apparatus 160 for receiving separately or simultaneously the mineral fiber wool tows pulled from mineral fiber packs 21a and 21b traveling along first and second take-away conveyors 30a and 30b, and transporting the tows to a chopping station 50. A chopping apparatus 60 is positioned at the chopping station 50 for chopping the tows into discrete lengths 22a. The conveying apparatus 160 further receives the discrete lengths 22a at the chopping station 50 and transports the discrete lengths to a collecting station 70. The conveying apparatus 160 further includes a collection device 80 located at the collecting station 70 for receiving the discrete lengths and collecting the discrete lengths for subsequent use.

The conveying apparatus 160 includes two collection hoods 162a and 162b and two first conduit sections 164a and 164b. A first gate valve device 170 is associated with first conduit section 164a for allowing the tow from the pack 21a to pass through the conduit section 164a when the first valve device 170 is in its open position and for preventing the tow from the pack 21b from passing through the section 164a when the first valve device 170 is in its closed position. A second gate valve device 172 is associated with first conduit section 164b for allowing the tow from the pack 21b to pass through the conduit section 164b when the second valve device 172 is in its open position and for preventing the tow from the pack 21a from passing through the conduit section 164b when the second valve device 172 is in its closed position. When it is desired to chop both tows simultaneously, both valve devices 170 and 172 are moved to their open positions. When only one of the two tows is to be chopped, only one of the two valve devices 170 and 172 is moved to its open position and the other valve device is closed.

While not shown in the illustrated embodiment, it is contemplated that two or more collecting stations 70 may be provided. For example, the two stations 70 could be used alternatively such that when the bag 82 in one station 70 is completely filled, an operator could quickly switch over to the other collecting station 70 via a conventional gate valve device or like element so as to reduce downtime.

Having described the invention in detail and by reference to the preferred embodiments thereof, it will be apparent that other modifications and variations are possible without departing from the scope of the invention defined in the appended claims.

We claim:

1. A system for forming a light-weight continuous mineral fiber wool tow and cutting the tow into discrete lengths comprising:

a conveying apparatus for pulling a mineral fiber wool tow from a mineral fiber pack at a first location and transporting said tow to a chopping station;

a chopping apparatus positioned at said chopping station for chopping said tow into discrete lengths, said chopping apparatus comprising rotatable cot and cutting rolls which define a cutting nip for receiving said tow and cutting said tow into discrete lengths, said cutting roll comprising a cutting wheel having a plurality of cutting blades, at least one of said cutting blades having generally symmetrical lateral portions on opposite sides of a center portion, ends of said lateral portions opposite to said center portion are offset from said center portion along an outer circumferential surface of said cutting wheel in a direction of rotation of said cutting wheel; and said conveying apparatus further receiving said discrete lengths at said chopping station and transporting said discrete lengths to a collecting station and including a collection device located at said collecting station for receiving said discrete lengths of mineral fiber wool material and collecting said discrete lengths for subsequent use.

2. A system as set forth in claim 1, wherein said chopping apparatus further comprises:

a drive motor for effecting rotation of said cot roll;

a substantially air-tight enclosure surrounding said cot roll and said cutting roll; and wherein said cot roll has a generally smooth outer circumferential surface.

3. A system as set forth in claim 2, wherein said cutting blades are spaced apart from one another about said cutting wheel.

4. A system as set forth in claim 3, wherein said at least one of said cutting blades extends axially across said cutting wheel and forms a V in its axial extension across said cutting wheel.

5. A system as set forth in claim 3, wherein said at least one of said cutting blades extends axially across said cutting wheel and is chevron-shaped in its axial extension across said cutting wheel.

6. A system as set forth in claim 3, wherein said blades are spaced apart from one another about said cutting wheel such that at least one blade is always in contact with said cot roll during rotation of said cot roll and said cutting roll.

7. A system as set forth in claim 3, wherein said cutting roll further comprises a plurality of teeth positioned about an outer circumferential edge of said cutting wheel, said teeth engaging said cot roll outer surface.

8. A system as set forth in claim 2, wherein said conveying apparatus further comprises a collection hood for receiving said mineral fiber tow; a nozzle extending into said air-tight enclosure for delivering said tow to said cutting nip; a first conduit section coupled to and extending between said hood and said nozzle; a second conduit section coupled to and extending between said chopping apparatus and said collection device and a vacuum pump associated with said collection device for drawing a vacuum in said collection device, said air-tight enclosure, said nozzle, said first and second conduit sections, and said collection hood.

9. A system as set forth in claim 8, wherein said conveying apparatus further comprises a third conduit section coupled to and extending between said collection hood and said second conduit section for defining a bypass path for said tow when said tow is to be conveyed to said collecting station without being cut into discrete lengths;

a first valve device associated with said first conduit section for allowing said tow to pass through said first conduit section when said first valve device is in its open position and for preventing said tow from passing through said first conduit section when said first valve device is in its closed position; and a second valve device associated with said third conduit section for allowing said tow to pass through said third conduit section when said second valve device is in its open position and for preventing said tow from passing through said third conduit section when said second valve device is in its closed position.

10. A system as set forth in claim 8, wherein said nozzle has at least one perforated side.

11. A chopping device for cutting a continuous mineral fiber wool tow into discrete lengths comprising:

a cot roll having a generally smooth outer circumferential surface;

a drive motor for effecting rotation of said cot roll;

a rotatable cutting roll juxtaposed to said cot roll and contacting said cot roll at its circumferential surface to rotate with said cot roll, said rotatable cutting roll and said cot roll defining a cutting nip for receiving said tow such that said tow is received in said nip and cut into discrete lengths, said cutting roll comprising a cutting wheel having a plurality of cutting blades associated therewith and spaced apart from one another circumferentially about said cutting wheel, and at least one of said cutting blades having lateral portions and a center portion which define a V, ends of said lateral portions opposite to said center portion are offset from said center portion along an outer circumferential surface of said cutting wheel in a direction of rotation of said cutting wheel.

12. A chopping device as set forth in claim 11, wherein said blades are spaced apart from one another about said cutting wheel such that at least one blade is always in contact with said cot roll during rotation of said cot roll and said cutting roll.

13. A chopping device as set forth in claim 11, wherein said cutting roll further comprises a plurality of teeth positioned about an outer circumferential edge of said cutting wheel, said teeth engaging said cot roll outer surface.

14. A chopping device for cutting a continuous mineral fiber wool tow into discrete lengths comprising:

a cot roll having a generally smooth outer circumferential surface;

a drive motor for effecting rotation of said cot roll;

a rotatable cutting roll juxtaposed to said cot roll and contacting said cot roll at its circumferential surface to rotate with said cot roll, said rotatable cutting roll and said cot roll defining a cutting nip for receiving said tow such that said tow is received in said nip and cut into discrete lengths, said cutting roll comprising a cutting wheel having a plurality of cutting blades associated therewith and spaced apart from one another circumferentially about said cutting wheel, and at least one of said cutting blades extending axially along said cutting wheel and is chevron-shaped in its axial extension along said cutting wheel.

15. A method for forming a light-weight continuous mineral fiber wool tow and cutting the tow into discrete lengths, comprising:

pulling a continuous light-weight mineral fiber wool tow from a mineral fiber pack;

conveying said tow to a chopping station;

chopping said tow into discrete lengths at said chopping station using a chopping apparatus comprising rotatable cot and cutting rolls, said cot and cutting rolls defining a cutting nip for receiving said tow and cutting said tow into discrete lengths, said cutting roll comprising a cutting wheel having a plurality of cutting blades having a shape such that airflow through the nip is controlled so that the light-weight tow is generally maintained centered as it travels through the nip; and transporting said discrete lengths from said chopping station to a collection station where said discrete lengths are collected for subsequent use.

16. A method as set forth in claim 15, wherein said cutting roll comprises a cutting wheel having a plurality of cutting blades associated therewith and spaced apart from one another about said cutting wheel, and at least one of said cutting blades extending axially along said cutting wheel and is chevron-shaped in its axial extension along said cutting wheel.

17. A method as set forth in claim 15, wherein said cutting roll comprises a cutting wheel having a plurality of cutting blades associated therewith and spaced apart from one another about said cutting wheel, and at least one of said cutting blades having lateral portions and a center portion which define a V, ends of said lateral portions opposite to said center portion are offset from said center portion along an outer circumferential surface of said cutting wheel in a direction of rotation of said cutting wheel.

18. A method as set forth in claim 15, wherein said step of conveying said tow to a chopping station comprises the step of using a vacuum conveying system to convey said tow to the chopping station.

19. A method as set forth in claim 15, wherein said step of transporting said discrete lengths from said chopping station to a collecting station comprises the step of using a vacuum conveying system to convey said discrete lengths to the collecting station.

20. A chopping device as set forth in claim 14, wherein base portions of said one chevron-shaped cutting blade are circumferentially spaced from a transition portion of said one blade.

* * * * *